(12) United States Patent
Chuah

(10) Patent No.: US 8,489,769 B2
(45) Date of Patent: Jul. 16, 2013

(54) INTELLIGENT COLLABORATIVE EXPRESSION IN SUPPORT OF SOCIALIZATION OF DEVICES

(75) Inventor: Mei Chuah, San Leandro, CA (US)

(73) Assignee: Accenture Global Services Limited, Dublin (IE)

( * ) Notice: Subject to any disclaimer, the term of this patent is extended or adjusted under 35 U.S.C. 154(b) by 2388 days.

(21) Appl. No.: 10/956,262

(22) Filed: Sep. 30, 2004

(65) Prior Publication Data

US 2006/0010240 A1    Jan. 12, 2006

Related U.S. Application Data

(60) Provisional application No. 60/508,816, filed on Oct. 2, 2003.

(51) Int. Cl.
*G06F 15/16* (2006.01)

(52) U.S. Cl.
USPC .......................................... 709/246; 709/203

(58) Field of Classification Search
USPC .................... 709/203, 230–232, 246
See application file for complete search history.

(56) References Cited

U.S. PATENT DOCUMENTS

| | | | |
|---|---|---|---|
| 4,789,894 A | 12/1988 | Cooper | |
| 5,347,506 A | 9/1994 | Matsudo et al. | |
| 5,745,161 A | 4/1998 | Ito | |
| 5,754,230 A | 5/1998 | Tsuruta | |
| 5,880,731 A | 3/1999 | Liles et al. | |
| 5,987,401 A | 11/1999 | Trudeau | |
| 6,076,104 A | 6/2000 | McCue | |
| 6,092,114 A * | 7/2000 | Shaffer et al. | 709/232 |
| 6,119,147 A | 9/2000 | Toomey et al. | |
| 6,161,082 A | 12/2000 | Goldberg et al. | |
| 6,301,609 B1 | 10/2001 | Aravamudan et al. | |
| 6,336,133 B1 | 1/2002 | Morris et al. | |

(Continued)

FOREIGN PATENT DOCUMENTS

| | | |
|---|---|---|
| EP | 1 168 197 | 1/2002 |
| GB | 2 351 216 | 12/2000 |

(Continued)

OTHER PUBLICATIONS

AIM Expressions, http://www.aim.com/get_aim/express/aim_expr.adp?aolp, 1 page.

(Continued)

*Primary Examiner* — Peling Shaw
(74) *Attorney, Agent, or Firm* — Brinks Hofer Gilson & Lione

(57) ABSTRACT

A method and apparatus for socialization of electronic devices is provided. Communications from a first person to a second person or to a group of persons may be enhanced, such as modified or supplemented, based on a user profile of the first person, the second person, and/or the group of persons. The user profile may comprise any one or any combination of the following: presence, expression, shared context, surrounding context, and device context. Moreover, enhancing the communication may comprise modifying or supplementing text, audio, video, image, scent, tactile and taste output. In addition, a communication is sent based on changes in a user profile. Changes in the user profile may comprise manual changes or automatic changes. Further, the content of the communication sent may depend on the aspect changed in the user profile.

28 Claims, 8 Drawing Sheets

U.S. PATENT DOCUMENTS

| | | | |
|---|---|---|---|
| 6,338,044 | B1 | 1/2002 | Cook et al. |
| 6,430,602 | B1 | 8/2002 | Kay et al. |
| 6,446,040 | B1 * | 9/2002 | Socher et al. ............... 704/260 |
| 6,449,344 | B1 | 9/2002 | Goldfinger et al. |
| 6,911,999 | B2 | 6/2005 | Sasaki |
| 7,036,083 | B1 | 4/2006 | Zenith |
| 7,071,971 | B2 | 7/2006 | Elberbaum |
| 7,123,302 | B2 | 10/2006 | Shiohara |
| 7,127,685 | B2 | 10/2006 | Canfield et al. |
| 7,298,409 | B1 | 11/2007 | Misawa |
| 7,397,958 | B2 | 7/2008 | Le Leannec et al. |
| 7,409,639 | B2 | 8/2008 | Dempski et al. |
| 7,543,327 | B1 | 6/2009 | Kaplinsky |
| 2001/0029455 | A1 | 10/2001 | Chin et al. |
| 2001/0037367 | A1 | 11/2001 | Iyer |
| 2002/0037767 | A1 | 3/2002 | Ebin |
| 2002/0099829 | A1 * | 7/2002 | Richards et al. ............ 709/227 |
| 2002/0133405 | A1 | 9/2002 | Newnam et al. |
| 2002/0133562 | A1 | 9/2002 | Newnam et al. |
| 2002/0133827 | A1 | 9/2002 | Newnam et al. |
| 2003/0014423 | A1 | 1/2003 | Chuah et al. |
| 2003/0018971 | A1 | 1/2003 | McKenna |
| 2003/0065721 | A1 | 4/2003 | Roskind |
| 2003/0078972 | A1 | 4/2003 | Tapissier et al. |
| 2003/0101450 | A1 | 5/2003 | Davidsson et al. |
| 2003/0105827 | A1 * | 6/2003 | Tan et al. ..................... 709/206 |
| 2003/0117500 | A1 | 6/2003 | Lin |
| 2003/0125927 | A1 | 7/2003 | Seme |
| 2003/0189668 | A1 | 10/2003 | Newnam et al. |
| 2004/0031058 | A1 | 2/2004 | Reisman |
| 2004/0066457 | A1 | 4/2004 | Silverstein et al. |
| 2004/0117831 | A1 | 6/2004 | Ellis et al. |
| 2005/0262542 | A1 | 11/2005 | DeWeese et al. |
| 2006/0015923 | A1 | 1/2006 | Chuah |

FOREIGN PATENT DOCUMENTS

| | | |
|---|---|---|
| WO | WO 02/01823 | 1/2002 |
| WO | WO 02/17101 | 2/2002 |
| WO | WO 02/073925 | 9/2002 |
| WO | WO 03/003342 | 1/2003 |
| WO | WO 03/017129 | 2/2003 |
| WO | WO 03/017640 | 2/2003 |
| WO | WO 03/017660 | 2/2003 |
| WO | WO 03/026299 | 3/2003 |
| WO | WO 03050645 A2 * | 6/2003 |

OTHER PUBLICATIONS

Bly, Sara A., Harrison, Steve R., and Irwin, Susan, Media Spaces: Bringing People Together in a Video, Audio and Computing Environment, *Association for Computing Machinery, Communications of the ACM*, ACM, 36, Jan. 1, 1993, pp. 28-47.

Börner, Katy, Hazlewood, William R., and Lin, Sy-Miaw, *Visualizing the Spatial and Temporal Distribution of User Interaction Data Collected in Three Dimensional Virtual Worlds*, Indiana University, SLIS, 10th Street & Jordan Avenue, Main Library 019, Bloomington, IN 47405, USA, 7 pages.

Dreifus, Claudia, A Conversation with Cynthia Breazeal; A Passion to Build a Better Robot, One with Social Skills and a Smile, *New York Times*, Jun. 10, 2003, pp. 1-3.

Gay, Geri and Lentini, Marc, Use of Communication Resources in a Networked Collaborative Design Environment, *JCMC*, 1, 1995, pp. 1-12.

Jakobsson, Mikael and Popdan, Victoria L., *How We Became Net Friends, and What We Learned from It*. Identities in Action, Umeå University, Umeå, Sweden; John Hopkins University, Baltimore, MD, USA, 12 pages.

Jakobsson, Mikael, *Why Bill Was Killed—Understanding Social Interaction in Virtual Worlds, Interactions in Virtual Worlds*. Umeå University, Umeå, Sweden, 8 pages.

Johnson, Colin G., and Jones, Gareth J.F., Effecting Affective Communication in Virtual Environments, *U.K. Technical Report No. 389*, Department of Computer Science, University of Exeter, Oct. 1999, 8 pages.

Kraut, Robert E., Fussell, Susan R., and Siegel, Jane, Visual Information as a Conversational Resource in Collaborative Physical Tasks, *Human-ComputerInteraction*, vol. 18, Lawrence Erlbaum Associates, Inc., 2003, pp. 13-49.

Kreijns, Karel and Kirschner, Paul A., Group Awareness Widgets for Enhancing Social Interaction in Computer-Supported Collaborative Learning Environments: Design and Implementation, $32^{nd}$ ASEE/IEEE *Frontiers in Education Conference*, Boston, MA, Nov. 6-9, 2002, 7pages.

Long, Byron. and Baecker, Ronald, A Taxonomy of Internet Communications Tools, in the *Proceedings of WebNet '97*, AACE, Toronto, Ontario, Canada, 1997, 15 pages.

Mynatt, Elizabeth D., Adler, Annette, Ito, Mizuko, O'Day, Vicki L., Design for Network Communities, in *Proceedings of CH '97: Conference on Human Factors in Computing Systems*, ACM, Mar. 22-27, 1997, pp. 210-217.

Olson, Judith S., Olson, Gary M., and Meader, David K., What Mix of Video and Audio is Useful for Remote Real-Tie Work?, In *Proceedings of CHI'95: Conference on Human Factors in Computing Systems*, New York, ACM, pp. 362-468.

Pruitt, Scarlet (IDG News Service), Microsoft Readies Business-Friendly IM—Users to get a preview of upcoming communications software, *PC World*, http://www.pcworld.com/resource/printable/article/0,aid,109716,00.asp, Mar. 6, 2003, 2 pages.

Reid, A.A.L., Comparing the Telephone With Face-to-Face Interaction, in *The Social Impact of the Telephone*, I. Pool (ed), Cambridge, MA, MIT Press, 1977, pp. 386-414.

Rogers, Yvonne, Brignull, Harry, Scaife, Mike, Designing Dynamic Interactive Visualization to Support Collaboration and Cognition, *Sixth International Conference on Information Visualisation (IV'02)*, England, Jul. 10-12, 2002, 10 pages.

Schwartz, Marilyn, and Task Force on Bias-Free Language. *Guidelines for Bias-Free Writing*. Indiana University Press, Bloomington, IN, 1995.

Sproull, Lee and Kiesler, Sara, *Connections: New Ways of Working in the Networked Organization*, Cambridge, MIT Press, 1991.

ThreeDegrees, www.threedegrees.com, 1 page.

Twidale, M.B., Rodden, T. & Sommerville, I., Developing a Tool to Support Collaborative Dialogues and Graphical Representation of Ideas. In *Collaborative Dialogue Technologies in Distance Learning*, F. Verdejo (ed), 1994, 11pages.

Williams, Ederyn, Experimental Comparisons of Face-to-Face and Mediated Communication: A Review, *Psychological Bulletin*, vol. 84, No. 5 1977, pp. 963-976.

Whittaker, Steve, Theories and Methods in Mediated Communication, in *The Handbook of Discourse Processes*, Graesser, A. (Ed.), MIT Press, 28 pages.

Office Action issued in U.S. Appl. No. 10/235,031 dated Jan. 31, 2007 (17 pgs).

Office Action issued in U.S. Appl. No. 10/235,031 dated Mar. 5, 2008 (16 pgs).

Office Action issued in U.S. Appl. No. 10/235,031 dated Sep. 12, 2008 (18 pgs).

Office Action issued in U.S. Appl. No. 10/235,031 dated Apr. 1, 2009 (20 pgs).

Office Action issued in U.S. Appl. No. 10/235,031 dated Nov. 5, 2009 (14 pgs).

Acuity. "Defining Web-based Customer Interaction," *Web-Center Enterprise*. (6 pgs).

Belville, S. (1991) *Zephr on Athena*, Massachusetts Institute of Technology, Version 3, pp. 1-30.

Champine, G.A. and Geer, D.E., Jr. (1990). "Project Athena as a Distributed Computer System", IEEE pp. 40-51.

Charny, B. Siemens Calls for 'Live Betting', located at http://zdnet.com/2001-11-0 visited on Aug. 15, 2002. (2 pgs).

DellaFera, C.A. et al. (1989) "Zephyr Notification Service" Section E. 41 In *Project Athena Technical Plan* Massachusetts Institute of Technology, pp. 1-35.

DellaFera, C.A. et al. (Feb. 1988). "The Zephyr Notification Service,"*Proceedings of the Winter 1988 USENIX Technical Conference*. pp. 1-9.

Diederiks, Elmo M.A. "Buddies in a Box Animated Characters in Consumer Electronics" IUI'03, Jan. 12-15, 2003, Miami, Florida.

Fermann, C.J. (1990) "Distributed Consulting in a Distributed Environment," *New Centerings in Computing Services* pp. 117-120.

French, R.S. and Kohl, J.T. (1989). *The Zephyr Programmer's*. MIT Project Athena, Protocol Version ZEPH0.2, pp. 1-82.

Funk, M. (Sep. 1999). "Brightware, Inc. and Post Communications Partner to Offer High-End Email Customer Service Solutions," Press Release located at http://list-news.com/articles/99September/091499.html visited Dec. 6, 2002. (1 pg).

International Business Machine Corporation (Apr. 1999). "Java Applet Language Translator," 42:570. (Includes publisher's contact information located at http://www.ibm.com/ibm/licensing/patents/disclosures/shtml).

International Business Machine Corporation (Oct. 2000). "Linking Instant Messaging to Publish/Subscribe Messaging," *Research Disclosure* 438:1875. (Includes publisher's contact information located at http://www.ibm.com/ibm/licensing /patents/disclosures.shtml).

Kamisugi, K. (Aug. 2000). "Banter Unveils Next-Generation Self-Service Solution," Press Release located at <http://www.bantger.com/news/relase/ne_release_unveil.shtm> visited Dec. 6, 2002. (2 pgs).

Looney, K. (Sep. 1998). "Activerse Partners with ObjectSpace to Deliver Industry Leading Java-Based Solutions: Activerse Embeds ObjectSpace's Award Winning JGL™ Software Into DingBot SDK™," PR Newswire Association, Inc. PR Newswire, available on LexisNexis™. (2 pgs).

Looney, K. (Aug. 1998). "Activerse Realeases DingBot SDK Beta Implementing Presence Applications with Ding!" PR Newswire Association, Inc. PR Newswire, available on LexisNexis™ (3 pgs).

Mihalik, A.D. "Project Athena: MIT's Computing Environment Has Grown from an Experiment to an experiment to an Impressive, Ubiquitous Network," located at http://www.tech.mit.edu/V119/n19/history_of_athe.19f.html. visited on Dec. 5, 2002. (2 pgs).

Murphy, S., Wiredbots, loacted at http://www.wiredbots.com/press.html. last visited on Dec. 6, 2002. (1 pg).

Rafter, M.V. (May 1999). "Why Isn't Online Customer Service Better," Located at http://www.cnn.com/TECH/computing/9905/14/service.idg/. visited Dec. 6, 2002. (4 pgs).

Rapp, D. (Oct. 2002). "Instant Messaging Took a While to Get Here, But Now its Here to Stay," *An MIT Enterprise Technology Review*. Located at http://www.technologyreview.com/articles/print_version/trailing1002.asp visited on Dec. 5, 2002 (1 pg).

Schylzrinne, H. and Rosenberg, J. (May/Jun. 1999). The IETF Internet Telephony Architecture and Protocols, *IEEE Network* pp. 18-23.

Simmons, R. et al (1997). "A Layered Architecture for Office Delivery Robots," *Proceedings of the First International Conference on Autonomous Agents*.(9 pgs).

Sims, D. (1999). "You Asked for It: Solving the Customer Support Dilemma," *New Architect* Located at http://www.newarcitectmag.com/archives/1999/11/sims/ visited Dec. 6, 2002. (7 pgs).

Yue, T. (Aug. 2001). "Learning to Embrace Athena," 121(37). Located at http://www.tech.mit.edu/V121?N37/col37taoyu.37c.html visited on Dec. 5, 2002. (2 pgs).

\* cited by examiner

INTELLIGENT COLLABORATIVE EXPRESSION IN SUPPORT OF SOCIALIZATION OF DEVICES

RELATED APPLICATIONS

This application claims the benefit of U.S. Provisional Application No. 60/508,816, filed Oct. 2, 2003, which is hereby incorporated by reference herein in its entirety.

BACKGROUND

Electronic devices which exchange information are, on a basic level, an opportunity for social interaction. People in different locales may connect with one another through the use of electronic devices. As one example, it is common for people at different locations to watch a television program or a sporting event while talking on the telephone. The television program acts as the backdrop for the people to interact. As another example, people interact and share information with one another in online social environments, such as instant messaging, short message service (SMS), chat rooms, and bulletin boards.

Most applications merely focus on functionality and usability, and fail to focus on sociability. Some technologies have attempted to enhance the social interaction aspect with limited success. For example, online social environments have attempted to enhance the social interaction aspect using collaborative applications such as text talk, sharing files and video conferencing. However, these applications are image and expression poor, limiting participants in how they can personalize and express their online persona.

What is needed is a richer information experience that provides better social interaction when using electronic devices.

BRIEF SUMMARY

The present invention enhances the social experience when sharing information using electronic devices. Electronic devices may include any device which is capable of sending and/or receiving a communication, including but not limited to computers, televisions, telephones (such as cellular phones), personal digital assistants (PDAs), and camcorders.

In one embodiment, a communication is sent from a first person to a second person or to a group of persons. The communication may be enhanced, such as modified or supplemented, based on a user profile of the first person, the second person, and/or the group of persons. The communication may be sent from the first person and received by a server or other centralized computer. The server may access the user profile in order to modify or supplement the communication. In this manner, the server or other centralized computer may enhance communications from a sociability standpoint. In one aspect, the user profile may comprise any one or any combination of the following: presence, expression, shared context, surrounding context, device context, and histories. Further, portions of the user profile may be modified by the user assigned the profile, by other users with permission, or automatically, such as by histories of past states of the user profile. Modifying or supplementing the communication may comprise modifying or supplementing text, audio, video, image, scent, tactile and taste output.

In a second embodiment, a communication is sent based on changes in a user profile. Changes in the user profile may comprise manual changes or automatic changes. Further, the content of the communication sent may depend on the aspect changed in the user profile.

DETAILED DESCRIPTION OF THE DRAWINGS AND THE PRESENTLY PREFERRED EMBODIMENTS

Figure 1:
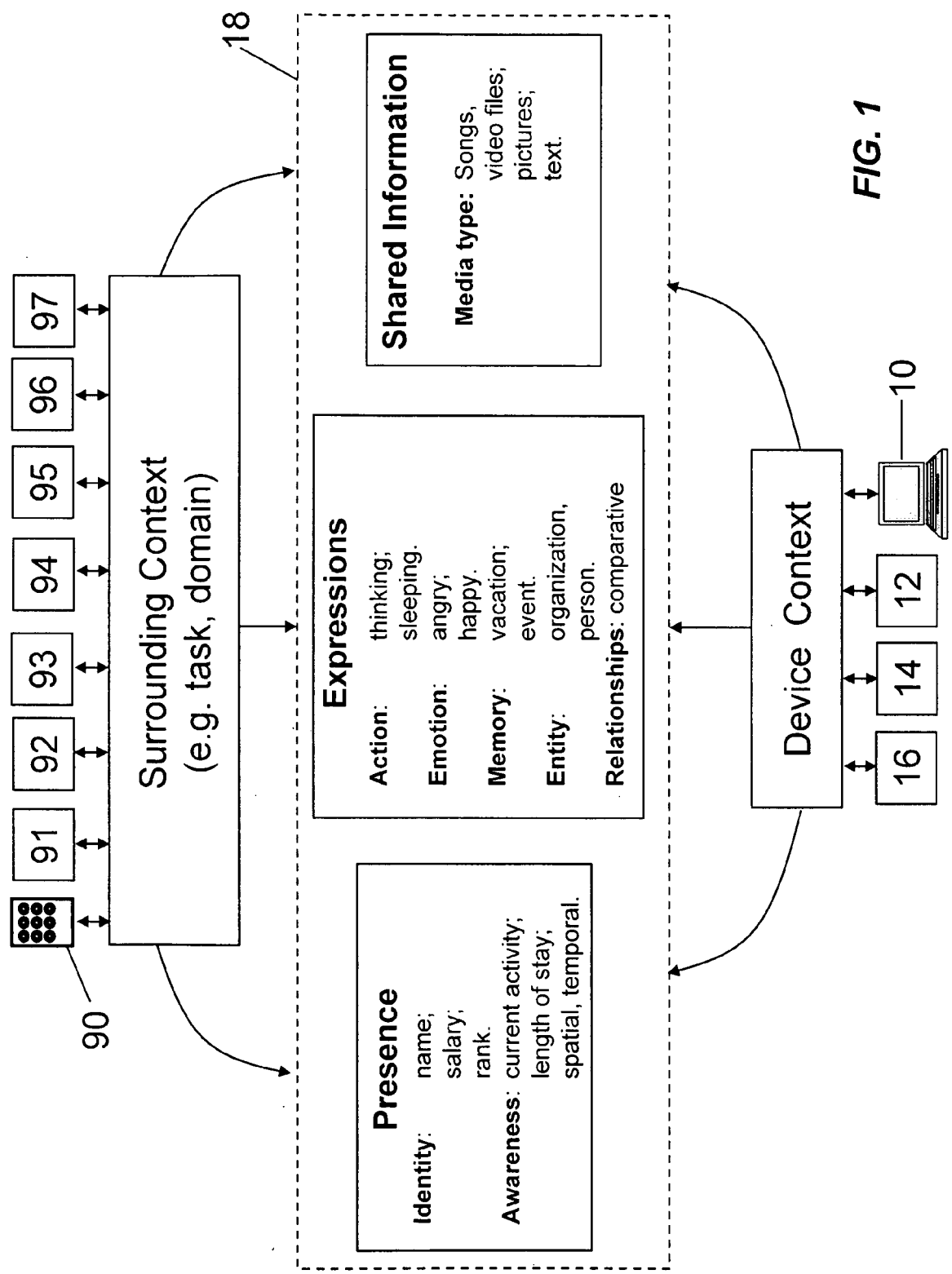
FIG. 1 is a flow diagram of exemplary aspects of social interaction.

Electronic devices can be instruments for social interaction. People may share information via the electronic devices in an attempt to connect on a social level. Oftentimes, electronic devices are used in single user mode and/or are merely used to regurgitate information. Information entered into one electronic device is transmitted to another device for presentation in its originally entered form. This mere repeating of the information limits the ability for people to connect on a social level since it does not mirror ordinary social interaction.

Socialization of electronic devices enables users of electronic devices to connect in a more social manner akin to ordinary social interaction. In order to better socialize electronic devices, a socialization system is employed which may express a user's individual traits. An example of a socialization system is disclosed in an article entitled Socialization of Devices by the inventor included at Appendix A of U.S. Provisional Application No. 60/508,816, filed Oct. 2, 2003, which is incorporated by reference herein in its entirety.

The socialization system identifies areas within collaborative space, which may then be expressed during electronic communication. Examples of areas within collaborative space include, but are not limited to: (1) the establishment of presence; (2) the ability to convey a wide range of expressions (including actions, emotions, memories, abstract concepts, and relationships); and (3) the ability to exchange and share external objects (including object streams such as video streams, television streams, device state, and environmental state). The socialization system may integrate these three areas of collaborative language to create a powerful environment for collaboration and experience sharing. Moreover, the socialization system may enable new tasks, new interactions, and new social behaviors. The socialization system is akin to the increased interaction due to cellular phone; however, the interaction is on a broader scale since the communication devices are allowed to be social connectors in the socialization system. In addition, the socialization system may allow more accurate conveying of thoughts at the correct time, place, and context.

In addition, the socialization system may comprise an integrated system for providing a combined social experience across a variety of devices. As discussed in more detail below, any electronic device which is capable of communicating (either receiving a communication, sending a communication or both) may be included within the socialization system. The socialization system may provide flexible and powerful control of presence, expression and shared context and may take into account device context, external environment, and histories. For example, the socialization system may comprise user profiles for users of the system. The profiles may contain any one or any combination of the following: presence, expression, shared context, device context (including device limitations and current device context), awareness context, and rules context. Further, the profiles may contain histories of any one or any combination of the following: presence, expression, shared context, device context, awareness context, and rules context. For example, one aspect of the user profile may comprise the current location or current activity of the user of the profile. The current location and/or current activity may be based on the current state or based on past states of the profile. Specifically, the past states of the user profile may indicate that the user travels to work at a certain time or that the user is in a business setting at a certain time or period. As another example, histories may indicate the amount of information a user has shared at particular times, such as time periods of the day or different days. This historical information regarding the amount of information shared may be used to determine the amount of information shared in a present communication. As still another example, histories may indicate the number of expressions a user has chosen to share at particular time periods. These histories may be used to determine the number of expressions which may be expressed in the communications. Still another example includes changes in rank. Rank, one of the aspects of presence, may change over time, such as at particular times of the day or different days of the week. These historical changes to rank may be used to determine a current rank for the user. The histories of the states may be collected automatically (e.g., the user's location is automatically determined and compared with a set of locations, such as home, work, etc. to determine the current location of the user) or may be entered manually by the user (e.g., the user inputs that he or she is at work). Further, the histories may reflect previous user interactions.

Moreover, the user profile may be changed, modified, enhanced, or added to by the user or by other users who have permissions. Different aspects of the profile may have different permissions. For example, the presence aspect of the user profile may have a permission which only allows the user to modify the presence aspect. Other aspects of the user profile, such as shared context, may be modified by the user and by other users.

The socialization system may comprise a rule-based system that determines how elements of the profile relate to each other, or how elements of the profile are applied (such as enabling new rules of control to be added either by a user or by a system administrator). The rules may be applied in a predetermined manner or may be applied based on "machine learning" algorithms which learn which rules are most appropriate for specific users. For example, the user profile may comprise rules for sending a communication at a particular time or when a particular event occurs.

The socialization system may mirror ordinary social interaction. Ordinary social interaction typically includes many simple and universal actions, such as a smile, a wave, laughter, etc. These universal actions, while simple in nature, convey a considerable amount of information and enable people to connect socially. Use of these universal actions in the socialization system enables better social interaction. The socialization system, thus, expands upon the collaborative language that is available to users when communicating with their co-workers or friends. The socialization system may integrate the "social experience" together across a variety of devices, allowing high levels of control to presence, expression, and shared context, and accounting for device context, external environment, and histories.

A variety of users may communicate using the socialization system. In one example, two users may communicate with one another using the socialization system. Alternatively, groups of users, such as users in a chat room, may communicate with one another using the socialization system. With a group of users, the users in the chat room may be able to receive user profile enhancements. Further, communications between the users may be enhanced based on the user profile of the person sending the communication and the user profiles of the persons receiving the communication. As discussed in more detail below, the communication may be modified or supplemented based on the user's profile. In the group context, the communication from a user to a group of users may be modified or supplemented based on the profile of the user sending the communication. Alternatively, the communication from the user to the group of users may be modified based on the profiles of the users receiving the communication. For example, the profile of someone receiving a communication may indicate that the user is at work. Based on this, the format of the communication may be modified based on the presence, expression, etc. of the recipient. Further, the device context of the recipient may likewise modify or supplement the communication. If the device context of a recipient's profile indicates that a certain recipient device is currently on, the communication may be sent to that device and/or may be modified for that device. In addition, if the device context of a recipient's profile indicates that a recipient device has certain capabilities, such as a color display, the communication may be modified to include color, or may be modified to appear in grayscale if the recipient device does not have color capability (in order to reduce the size of the communication).

Further, the socialization system may apply to different types of users. One type of user is a human being. Another type of user is an interactive agent or bot. A bot is a software robot that interacts with users over text messaging services like instant messaging (IM), web chat, or wireless networks. There are many types of bots, such as social bots, transaction bots, etc. Similar to human beings, a bot may have a profile associated with it.

Turning to the drawings, wherein like reference numerals refer to like elements, FIG. 1 shows a flow diagram of exemplary aspects within collaborative space, as discussed above. One aspect of collaborative space is the shared information. Shared information may comprise any media type that is presented among electronic devices including songs, video files, pictures, and/or text. For example, when two electronic devices, such as television receivers, receive a common broadcast, the shared information that is presented on the television receivers may be the video broadcast feed. Another aspect of collaborative space is participant information. Participant information generally relates to factual information about a participant, such as presence, or ideas that a participant wants to covey, such as expressions. Presence may include any short-term or long-term attributes about a participant to a social interaction. Specifically, presence may include identity, such as name, salary, rank, etc. and awareness, such as current activity, length of stay, spatial information (absolute location or location relative to someone else), and temporal information (how long performing certain activity). Expression may include any concepts the participant wishes to convey such as an action (e.g., thinking, sleeping, eating, etc.), emotion (e.g., angry, happy, sad, etc.), memory (e.g., vacation, event, etc.), entity (e.g., organization, person, etc.) and relationships (e.g., comparative relationships). The presence, expression, and shared information aspects may be stored in a database 18, as discussed further below.

Another aspect is the surrounding context of the shared communication. The surrounding context may include the physical surroundings of one or both of the participants to a shared information session, including current location (e.g., home, business, vacation), temperature, light, noise, odor, taste, etc. The surrounding context data may be input either manually, such as using a keypad 90, or automatically, such as through a light sensor 91, an auditory sensor 92, a temperature sensor 93, a barometer 94, a GPS sensor 95, an odor sensor 96, and a taste sensor 97. Other environmental sensors are possible. Another aspect is the device context. The device context may include the specific parameters or data regarding the electronic device to a communication. The specific parameters or data regarding the electronic devices may be input from the electronic devices or may be manually input. For example, the electronic devices, such as a computer 10, telephone 12 (such as a cellular phone), personal digital assistant 14 (PDA), television 16, or any other electronic device capable of connectivity may input data as device context to the user profile. The parameters or data may relate to specific requirements and/or limitations of the electronic devices. For example, a telephone has limitations regarding displaying video or text information. This information regarding the limitations may be used when communicating with the device. The device context may further include current device context, such as the device state (e.g., is the device on or off; whether the user is using the device, such as communicating on the telephone). Finally, another aspect is rules context. As discussed above, the socialization system may comprise a rule-based system that determines how elements of the profile relate to each other, or how elements of the profile are applied. The rules in the socialization system may be implemented using the rules context in the user profile.

In addition to the presence, expression, shared information, histories, device context, surrounding context, and rules, the user profile may contain how elements of the user profile may be manifested. For example, an aspect of the user profile, such as expression may be manifested in a variety of ways. The expression, such as happiness, may be manifested in a more overt manner, such as a laughing emoticon, or in a more subdued fashion, such as a smiley face.

The electronic devices communicating in a shared information session may be connected in a variety of ways including a wired connection (such as a telephone line), a wireless connection, or a combination of wired and wireless connection. Further, the topography for the connection of the various electronic devices may vary. For example, the electronic devices may be interconnected via a communications network, which can be a LAN, WAN, intranet or the Internet.

Further, the system may include peer-to-peer communication in that the communication and some of the shared information may be transmitted peer-to-peer. In this configuration, the socialization system may be considered a peer. And, examples of communications with the socialization system as a peer include obtaining profile attributes and updates, which may then be integrated external of the socialization system.

Figure 2:
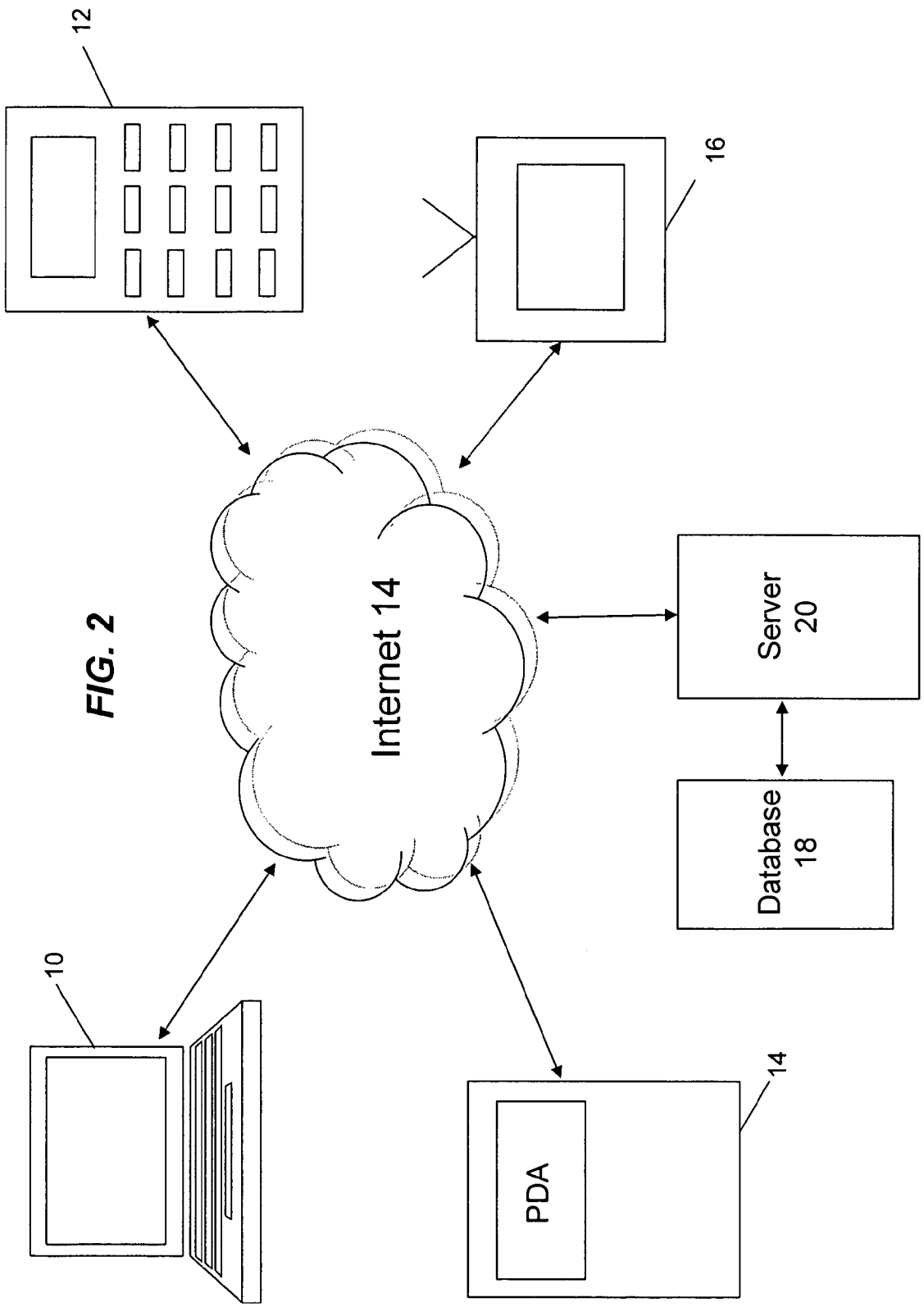
FIG. 2 is a block diagram of exemplary devices that may communicate via a network.

One example topology is shown in FIG. 2, wherein a plurality of electronic devices 10, 12, 14, 16 communicate via Internet 14. The electronic devices include, for example, personal computer 10, telephone (wired or wireless) 12, PDA 14, and television 16. Other electronic devices capable of communicating or connectivity, such as one-way communication devices (devices which may receive a communication or which may transmit a communication) or two-way communication devices (devices which may receive and transmit a communication) may be used. Examples of other electronic devices which may be used include camcorders, cameras, or other connectivity devices. Connectivity devices may include, for example, any object that has connectivity capabilities, such as an "enhanced toy" which has communication functions (such as a wireless speaker) embedded in the toy.

The electronic devices may communicate with one another via server 20. The electronic devices may send communications directly to the server 20 with the address of the ultimate destination included in the communication. In a network environment in which the communications network is the Internet, for example, the server 20 can be a Web server with which the electronic devices communicate via any of a number of known protocols, such as HTTP. As discussed in more detail below, a sender may send an electronic communication to a recipient's electronic device. The server 20 may receive the communication and make decisions as to modifying or adding to the communication based on the sender's user profile stored in database 18. Further, the server 20 may make decisions as to modifying or adding to the communication based on the recipient's user profile stored in database 18. The modifications or additions to the communication are then sent to the recipient's electronic device. Further, the server 20 may send a communication based on the user profile, such as based on changes to the user profile. As shown in FIG. 2, the server 20 and the database 18 are separate entities. Alternatively, the server 20 and the database 18 may be an integral unit.

Figure 3:
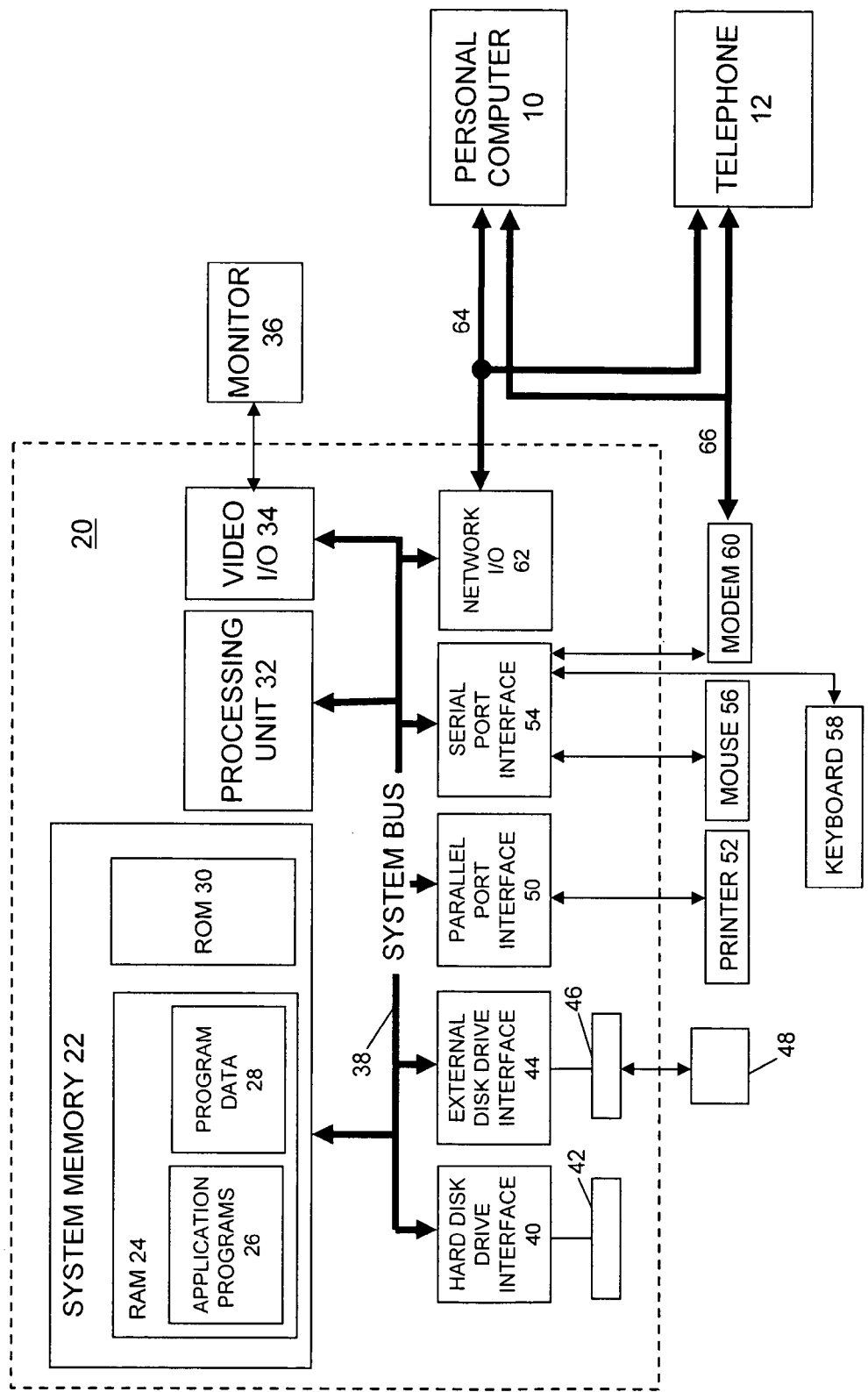
FIG. 3 is a block diagram of the personal computer 10, telephone 12, and server 20 illustrated in FIG. 2.

Referring to FIG. 3, there is shown a block diagram of personal computer 10, telephone 12, and server 20 illustrated in FIG. 2. Server 20 may be a general purpose computing device in the form of a conventional personal computer, including a processing unit 32, a system memory 22, and a system bus 38, that couples various system components including the system memory 22 to the processing unit 32. The processing unit 32 may perform arithmetic, logic and/or control operations by accessing system memory 22. The system memory 22 may store information and/or instructions for use in combination with processing unit 32. The system memory 22 may include volatile and non-volatile memory, such as random access memory (RAM) 24 and read only memory (ROM) 30. A basic input/output system (BIOS) containing the basic routines that helps to transfer information between elements within the server 20, such as during start-up, may be stored in ROM 30. The system bus 38 may be any of several types of bus structures including a memory bus or memory controller, a peripheral bus, and a local bus using any of a variety of bus architectures.

The server 20 may further include a hard disk drive 42 for reading from and writing to a hard disk (not shown), and an external disk drive 46 for reading from or writing to a removable external disk 48. The removable disk may be a magnetic disk for a magnetic disk driver or an optical disk such as a CD ROM for an optical disk drive. The hard disk drive 42 and external disk drive 46 are connected to the system bus 38 by a hard disk drive interface 40 and an external disk drive interface 44, respectively. The drives and their associated computer-readable media provide nonvolatile storage of computer readable instructions, data structures, program modules and other data for the server 20. The database 18, as shown in FIG. 2, may be a separate data storage device accessible by server 20, or may be resident within server 20, such as located in hard disk drive 42 or external disk 48. Further, although the exemplary environment described herein employs a hard disk and an external disk 48, it should be appreciated by those skilled in the art that other types of computer readable media which can store data that is accessible by a computer, such as magnetic cassettes, flash memory cards, random access memories, read only memories, and the like, may also be used in the exemplary operating environment.

A number of program modules may be stored on the hard disk, external disk 48, ROM 30 or RAM 24, including an operating system (not shown), one or more application programs 26, other program modules (not shown), and program data 28. One such application program may include the functionality as detailed in FIGS. 4-6.

A user may enter commands and/or information, as discussed below, into the server 20 through input devices such as mouse 56 and keyboard 58. Other input devices (not shown) may include a microphone (or other sensors), joystick, game pad, scanner, or the like. These and other input devices may be connected to the processing unit 32 through a serial port interface 54 that is coupled to the system bus 38, or may be collected by other interfaces, such as a parallel port interface 50, game port or a universal serial bus (USB). Further, information may be printed using printer 52. The printer 52, and other parallel input/output devices may be connected to the processing unit 32 through parallel port interface 50. A monitor 36, or other type of display device, is also connected to the system bus 38 via an interface, such as a video input/output 34. In addition to the monitor 36, server 20 may include other peripheral output devices (not shown), such as speakers or other audible output.

The server 20 may communicate with other electronic devices such as personal computer 10 and telephone 12. As discussed above, personal computer 10 and telephone 12 may send communications to one another via server 20. Server 20 may modify or supplement the communications before sending the communication to the recipient device. Personal computer 10 may include many or all of the elements described above relative to the server 20. Further, telephone 12 may include a processor, a memory device and a display.

To communicate, the server 20 may operate in a networked environment using connections (wired, wireless or both wired and wireless) to one or more electronic devices. FIG. 3 depicts the computer environment networked with personal computer 10 and telephone 12. The logical connections depicted in FIG. 3 include a local area network (LAN) 64 and a wide area network (WAN) 66. Such networking environments are commonplace in offices, enterprise-wide computer networks, intranets and the Internet (as shown in FIG. 2).

When used in a LAN networking environment, the server 20 may be connected to the LAN 64 through a network I/O 62. When used in a WAN networking environment, the server 20 may include a modem 60 or other means for establishing communications over the WAN 66. The modem 60, which may be internal or external to server 20, is connected to the system bus 38 via the serial port interface 54. It will be appreciated that the network connections shown are exemplary and other means of establishing a communications link between the electronic devices may be used.

Figure 4:
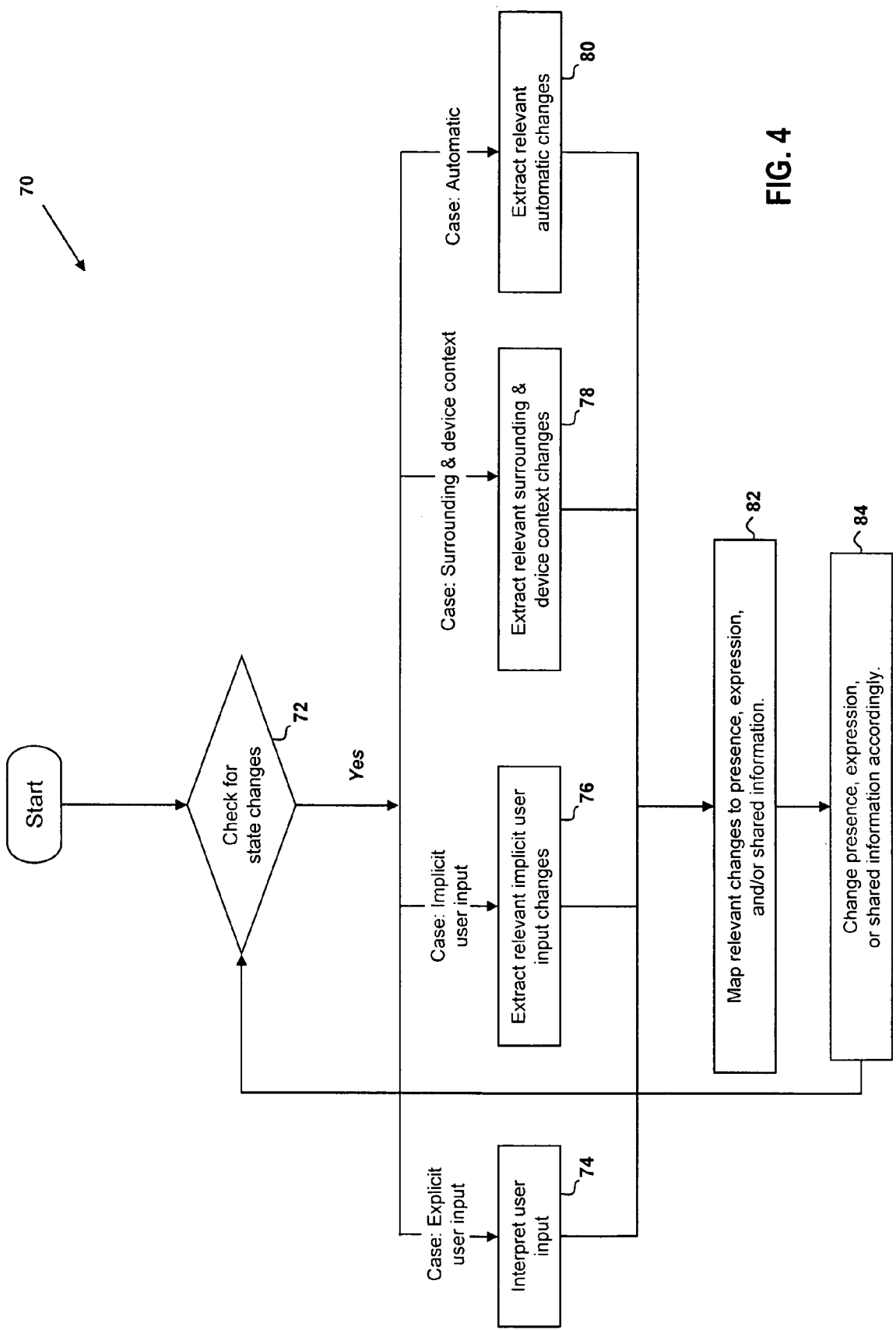
FIG. 4 is a flow chart of a system that uses the attributes disclosed in FIG. 1 to modify participant information and/or shared information.

As discussed above, a user profile may be stored in database 18. The content of the user profile may be generated in a variety of ways. For example, the user profile may be generated by a user answering a series of questions, such as a personality profile. The answers may be used to provide data regarding presence and expression. Further, the user profile may be updated in a variety of ways. One example of updating participant information and/or shared information is shown in FIG. 4. FIG. 4 is a flow chart 70 of a system that uses the attributes disclosed in FIG. 1 to modify participant information and/or shared information. At block 72, state changes are checked. State changes may designate a change in status of the system. One example of a state change comprises explicit user input. Explicit user input may include commands from a user to change or modify a portion of the user profile. Specifically, the participant may directly specify how identity, expression, and/or shared information should change. For example, the participant may update his or her emotion information by explicitly typing in his or her current emotion. As another example, the user may manually input surrounding context information via the keypad 90. Upon receipt of explicit user input, the user input is interpreted to determine the change to the user profile, as shown at block 74. Another example of a state change comprises implicit user input. Implicit participant input may include any indirect input by the participant such as: (1) automatic reaction information of the participant, such as by determining a participant's reaction to the shared information by sensors, as discussed subsequently; and (2) input from other controllers/devices the participant may be using, such as a remote controller. Upon receipt of implicit user input, the user input is interpreted to determine the change to the user profile, as shown at block 76. Still another example of a state change may comprise surrounding and/or device context. Surrounding context changes may determine whether there is any change in the surroundings of the participant. As discussed above, the surroundings context may include information regarding current location, temperature, light, noise, etc. For example, the surrounding context may receive information automatically, such as from a variety of sensors, including a GPS sensor 97, a light sensor 91, a sound sensor 92, a temperature sensor 93 (such as a thermocouple), a barometer sensor 94, an odor sensor 96, and a taste sensor 97. Information regarding location, light, noise, temperature, humidity, odor, taste, or other environmental data may be automatically input and may modify the user profile. Changes in the surrounding context may modify the user profile. For example, location information may modify the awareness aspect of the user profile. The surrounding context in a recipient's profile may also be used in modifying communication for the recipient, as discussed in more detail below.

Device context changes determine whether there is any change in the device used (such as switching from a computer to a television) or in the capabilities of the device (such as a change in cellular phone service). As shown at block 78, the relevant surrounding and/or device changes are extracted. Yet another example of a state change may comprise automatic changes. Automatic changes may include changes in the shared information; changes in identity, expression, or objects made by other systems; idle changes made by the system on a previous iteration; and changes in identity, expression, or object made by the system on a previous iteration (as shown at block 84). The relevant changes may be mapped to a presence, expression and/or shared information, as shown at block 82. The changes may then be implemented, as shown at block 84. For example, changes in one aspect may affect another aspect in the system.

Expression of the user profile may enable better socialization of electronic devices. The expression of the user profile may take a variety of forms. In one form, the expression may comprise modifying or supplementing communications which are sent from a first person using a first electronic device to a second person using a second electronic device. The user profile of the first person may be used to modify the communication or used to add information to the communication. In another form, the expression may comprise sending a communication based on changes to the user profile. Changes to the user profile, as discussed above, may prompt a communication to be sent.

Figure 5:
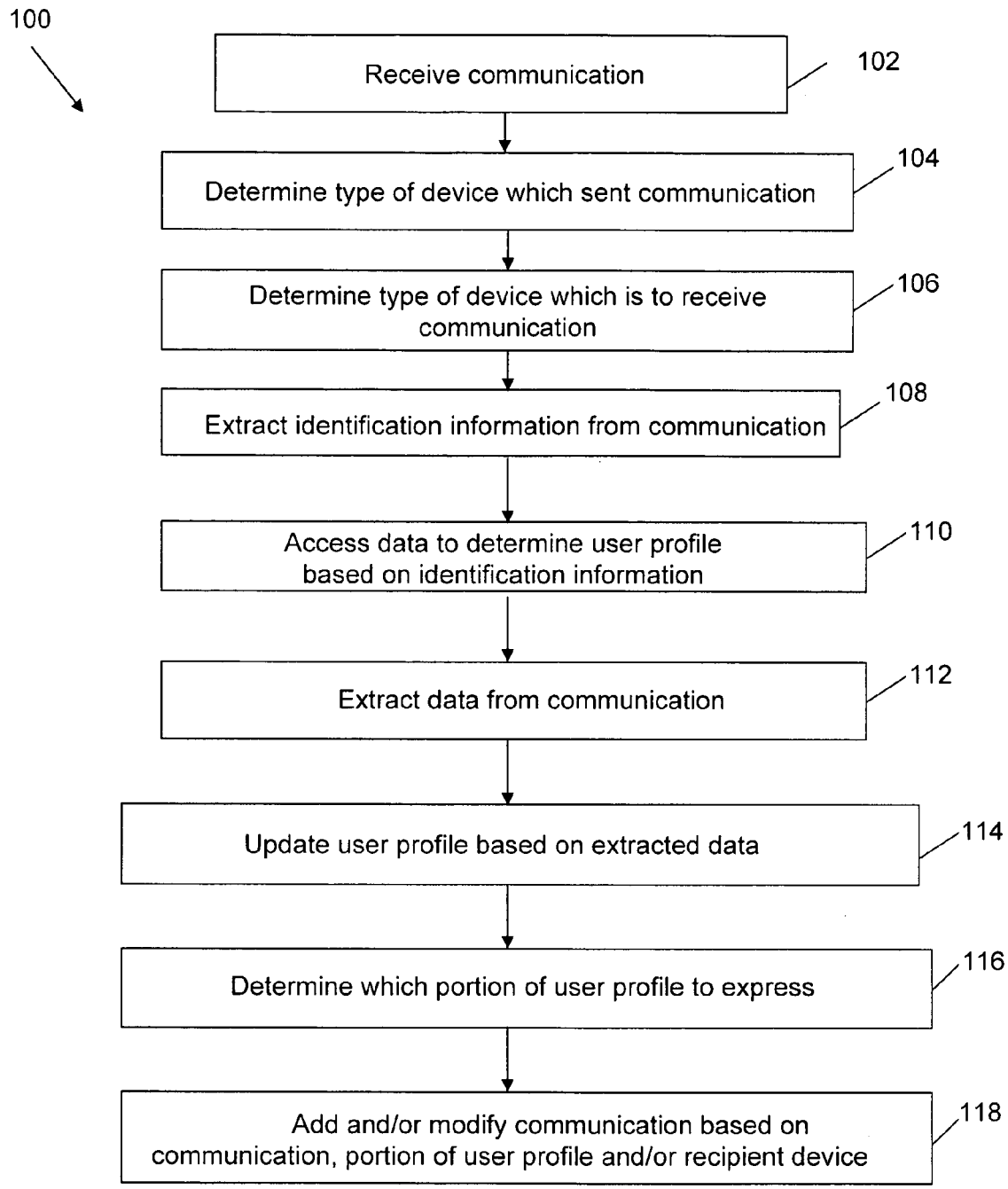
FIG. 5 is a flow chart in which a communication may be modified or supplemented based on the user profile.

Referring to FIG. 5, there is shown a flow chart 100 in which the communication is modified or supplemented based on the user profile. As shown at block 102, the server receives the communication. The server may determine the type of device which sent the communication, as shown at block 104. Further, the server may determine the type of device which is the designated recipient, as shown at block 106. Identification information may be extracted from the communication, as shown at block 108. The identification information may be in the form of an e-mail address of the sender, a cellular or landline telephone number, an instant messaging ID, etc. The server may determine the name of the user based on a look-up table which correlates identification information with user names.

As shown at block 110, the database may be accessed to determine the specific user profile based on the identification information (such as by accessing the user profile using the identification information or by accessing the user profile using the name of the user). In instances where the communication may affect the user profile, data may be extracted from the communication, as shown at block 112, and be used to update the user profile, as shown at block 1114. The portion of the user profile to be expressed may be determined, as shown at block 116. In one embodiment, the portion may be determined based on the most recently updated aspect of the user profile. In another embodiment, the portion may be determined based on the content of the communication. In still another embodiment, the portion may be determined based on user profiles, surrounding context, device context, histories, and rules context. The communication may be modified or supplemented based on the user profile, the communication itself, and/or the recipient device, as shown at block 1118.

Figure 6A:
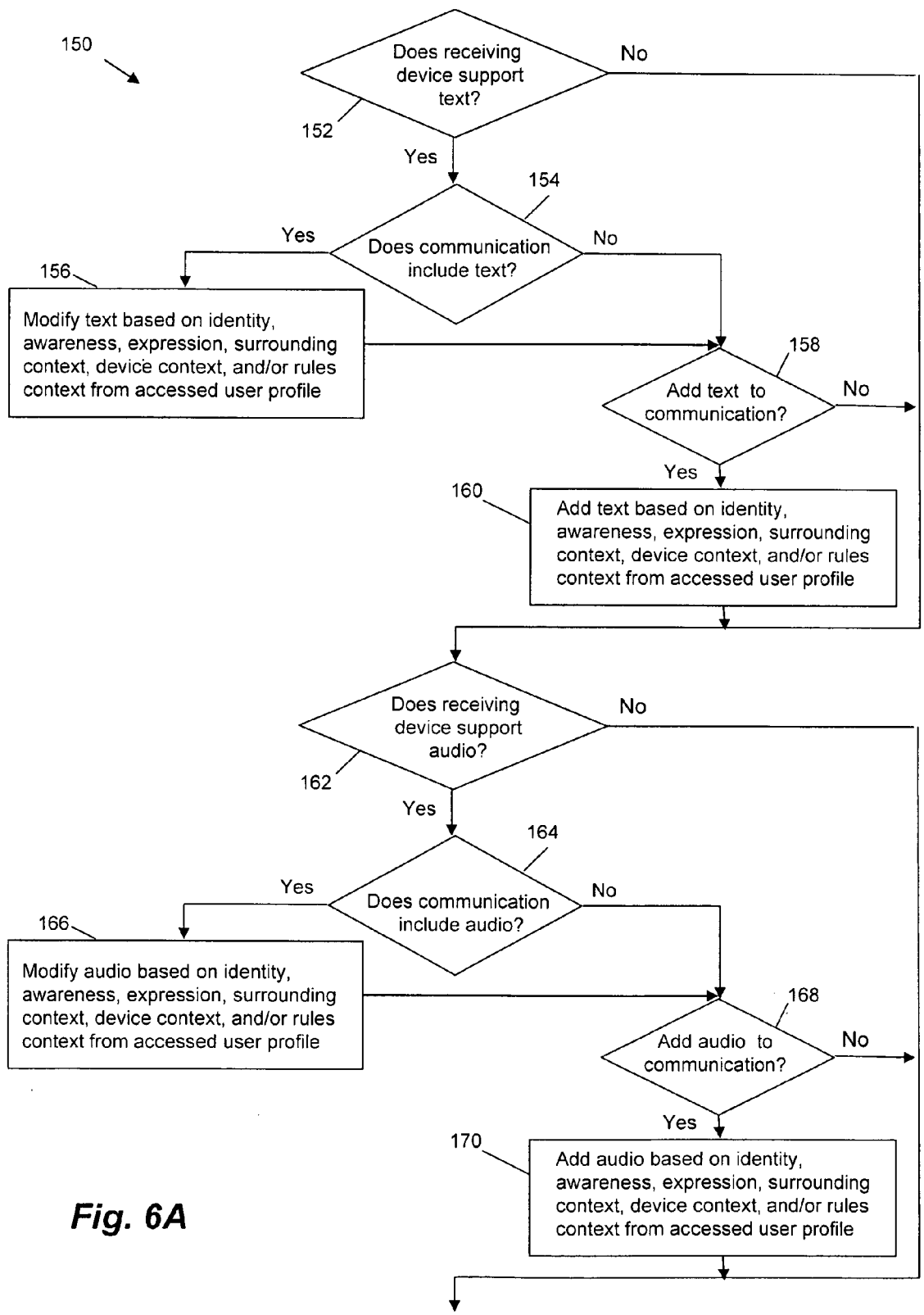
FIGS. 6A-B is a flow chart for modifying or supplementing the communication as discussed in block 118 in FIG. 5.
Figure 6B:
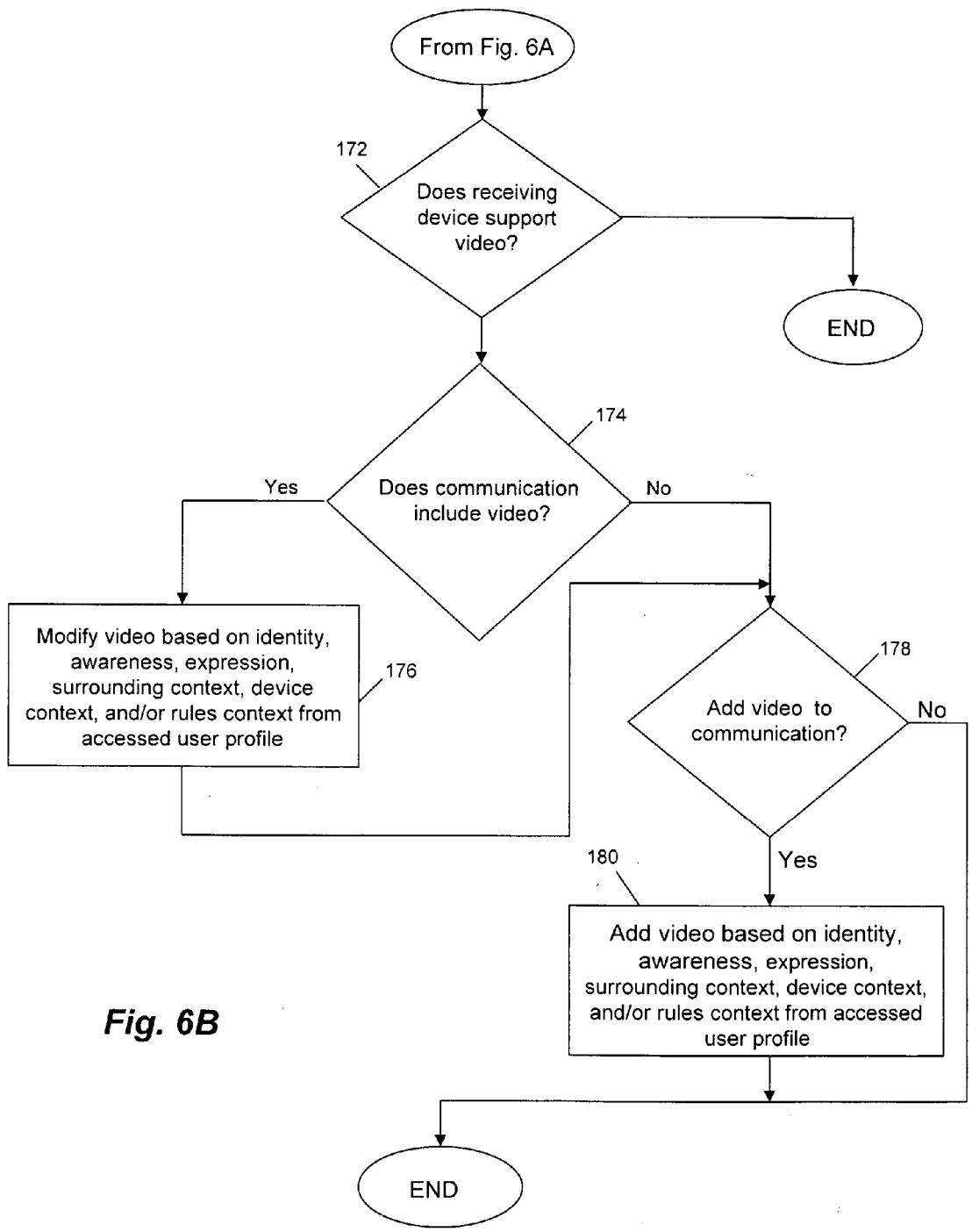

Referring to FIGS. 6A-B, there is shown a flow chart 150 for modifying or supplementing the communication as discussed in block 1118 in FIG. 5. As shown at block 152, it is determined whether the receiving device supports text. As discussed with respect to block 106 in FIG. 5, the type of receiving device is determined. Based on the type of device, it may be determined whether the receiving device supports text.

If the receiving device supports text, it is determined whether the communication includes text, as shown at block 154. Alternatively, the communication may first be checked to determine if it includes text, and then it may be determined if the receiving device supports text. If the communication includes text, the text may be modified based on the user profile, as shown at block 156. Any portion of the user profile may be used to modify the text including identity, awareness, expression, surrounding context, device context, histories, and/or rules contest of the user profile. As discussed in more detail below, the form and/or the substance of the text may be modified. For example, the form, such as the font, the case, the size, the background, etc. regarding the text may be modified. As another example, the substance of the text, such as the content, may be modified.

Whether or not the communication includes text, it is determined whether to add text to the communication, as shown at block 158. If text is to be added, the added text may be based on the user profile, as shown at block 160. Any portion of the user profile may be used to add text including identity, aware-ness, expression, surrounding context, device context, histories, and/or rules contest of the user profile.

As shown at block 162, it is determined whether the receiving device supports audio. If the receiving device supports audio, it is determined whether the communication includes audio, as shown at block 164. Alternatively, the communication may first be checked to determine if it includes audio, and then it may be determined if the receiving device supports audio. If the communication includes audio, the audio may be modified based on the user profile, as shown at block 166. Any portion of the user profile may be used to modify the audio including identity, awareness, expression, surrounding context, device context, histories, and/or rules contest of the user profile. As discussed in more detail below, the form and/or the substance of the audio may be modified. For example, the form, such as the volume, the pitch, etc. regarding the audio may be modified. As another example, the substance of the audio, such as the content, may be modified.

Whether or not the communication includes audio, it is determined whether to add audio to the communication, as shown at block 168. If audio is to be added, the added audio may be based on the user profile, as shown at block 170. Any portion of the user profile may be used to add audio including identity, awareness, expression, surrounding context, device context, histories, and/or rules contest of the user profile.

As shown at block 172, it is determined whether the receiving device supports video. If the receiving device supports video, it is determined whether the communication includes video, as shown at block 174. Alternatively, the communication may first be checked to determine if it includes video, and then it may be determined if the receiving device supports video. If the communication includes video, the video may be modified based on the user profile, as shown at block 176. Any portion of the user profile may be used to modify the video including identity, awareness, expression, surrounding context, device context, histories, and/or rules contest of the user profile. As discussed in more detail below, the form and/or the substance of the video may be modified. For example, the form, such as the color, volume, etc. regarding the video may be modified. As another example, the substance of the video, such as the content, may be modified.

Whether or not the communication includes video, it is determined whether to add video to the communication, as shown at block 178. If video is to be added, the added video may be based on the user profile, as shown at block 180. Any portion of the user profile may be used to add video including identity, awareness, expression, surrounding context, device context, histories, and/or rules contest of the user profile. As shown in FIGS. 6A-B, the text, audio, or video may be either modified or supplemented. In an alternate embodiment, the text, audio, or video may be modified and supplemented.

As discussed above, the communication may be modified or supplemented based on the user profile including: (1) determining presence and/or expression information based on shared information; (2) determining shared information based on presence or expression information; (3) determining expression information based on presence information; (4) determining presence information based on expression information; and (5) determining shared information and/or participant information based on surrounding context or device context.

Presence and/or Expression Information Determined Based on Shared Information

As discussed above, shared information may comprise a communication sent from a first electronic device to a second electronic device (or to a plurality of electronic devices). The shared information may determine presence and/or expression information. Specifically, the shared information may be used to determine aspects of the user profile, such as presence and/or expression.

There are a variety of examples wherein the shared information may determine presence and/or expression information. As one example, the presence and/or expression information may describe certain aspects of the user (e.g., identity, awareness, and preferences) such as indicating that a user is a fan of a specific team. The shared information may indicate performance of a specific team, such as the team scoring or the team losing a game. For example, a first user may send a message or an article to a second user regarding the game. Or, the first and second users may be jointly receiving the same shared information, such as a television broadcast of the game. Depending on an event in the shared information, such as one team scoring, the shared information may indicate presence and/or expression. Specifically, if the first user's favorite team scores, the first user's expression in the first user's profile may be changed to cheering.

An event in the shared information may be determined in several ways. One way is to include a separate data stream along with the shared information to indicate an event. For example, the data feed may indicate "goal scored at XX:XX time" or "people are laughing now." Based on this data feed, the presence and/or expression information may be examined. Another method is to review certain aspects of the shared information, such as text, sound, portions, or all of the video, to determine if an event has occurred. The event may also be based on a general event, such as a certain noise level or a certain type of noise.

In the sports example discussed above, the shared information may indicate performance of a specific team. If the rules context indicates that a user is a fan of a specific team, when the specific team scores, this event may trigger a change in the user profile, such as a change to the presence or expression aspects of the user profile. The change in profile may thus trigger changes in the shared context or shared information. For example, a change in the action or emotion expressions may trigger a change in the representation. In the sports example, the representation associated with the user may "cheer," reflecting the change in the user profile.

Further, when the noise is above or below a certain level, the user profile may be modified. In times of great noise, the user profile may reflect the action of cheering (thereby triggering the representation to "cheer" as well). Similarly, in times of minimal noise, the use profile may reflect the action of hushed silence (thereby triggering a modification in the representation). In an example of a shared video program, the audio may be checked for a certain type of noise, such as laughing. If the specific type of noise is registered, this may modify the user profile, thereby triggering a modification in the representation. Thus, the representation may convey information in addition to and/or in conjunction with the shared information.

Shared Information Determined Based on Presence and/or Expression Information

Expression and/or presence information may determine or may modify the information shared between a first electronic device and a second electronic device. In that manner, the shared information is not merely reproduced from one electronic device to another; instead, the participant information is selected or changed to reflect a specific participant (either based on a fact about the participant, which is included in presence information, or based on an idea the participant wishes to convey which is included in expression information).

The supplementing or modifying of the shared information enhances the shared information experience. Specifically, the shared participant experience may be tailored for a specific person, using the characteristics of the specific person, such as the specific person's traits or participant's ideas. In this manner, the electronic devices personalize the shared information experience rather than merely regurgitate the shared information.

As discussed previously, presence information may include factual information about the participant and expression information may include idea information that the participant wishes to convey. In order to enhance the shared communication session, either presence or expression information may be used to determine the information shared or may be used to modify the information shared. With regard to presence, the identity of the participant may determine the shared object. For example, if the identity of a participant is a businessperson, the expressions and the shared information may be chosen reflect the status of a businessperson. Specifically, if shared information is a song or a video, the choice of song or video and the noise level may reflect the conservative demeanor of a businessperson. Likewise, if the identity of a participant is a teenager, the shared information may reflect the status of a teenager. With regard to expressions, if action indicates sleeping (i.e., the participant wishes to convey the concept of sleeping), other participants may be notified of this by sharing information which indicates sleeping (such as sending a picture or song about of nighttime). As another example, emotion may be conveyed by sending information (video/text, etc.), which indicates anger.

Moreover, the presence and/or expression of the first user may be manifested by supplementing or modifying the shared communication. Supplementing the communication may take several forms. One form is an abstract representation, such as avatar, which is a graphical icon of a real person, or an emoticon. For example, the avatar may be entirely animated or may be based, in part, on an actual representation of a person (such as an image of a face). Further, the selection of the representation may reflect aspects of presence and/or expression. For example, the representation may reflect the identity of the sender. The representation may reflect the position of the sender, such as the position of a businessperson. Similarly, the representation may reflect the awareness of the sender. For example, the current activity of the sender (such as working at the office, relaxing at home, sleeping, reading, watching television, etc.) may manifest itself in the selection of the representation. Moreover, the representation may reflect the expression of the user. For example, the current action or emotion may be reflected in the choice of representation. A thinking action may be reflected in a choice of a representation (such as Rodin's the Thinker). An angry emotion may likewise be reflected in the selection of an avatar with a scowling countenance or a frown.

As still another example, the presence and/or expression information may modify the form of the communication, such as modify the form of the text (change case, font, size, etc.), modify the form of the audio (change volume, pitch, etc.) or modify the form of the video (change contrast, volume, pitch, etc.). The selection of the modifications may reflect the presence and/or expression of the sender's user profile. For example, selection of the font, size, etc. may reflect the identity of the sender. If the sender is a businessperson, the font, size, etc. may reflect the demeanor of a businessperson. Moreover, the awareness of the sender, such as the current activity of the sender, may reflect in modifications to the communication. If the sender's current activity is working or relaxing, the modifications may reflect the current activity. Further, the expressions of the sender, such as the action or emotion of the sender, may reflect in modifications to the communication. If the sender's current emotion is anger, the emotion may be reflected in modifications to the text (changing to a larger font, changing case, etc.), modifications to the volume (increasing the volume, pitch, etc.), or modifications to the video (increasing the volume).

As another example, the participant information may modify the content of the shared information. Specifically, information to be shared between a first and second participant may be modified by the presence and/or expression information of one of the participants. As one example of presence information affecting the shared information, presence which has not changed in a while, such as because of any additional input, may modify the shared information to relaxing music. With regard to expressions, in the example where the action indicates sleeping, other participants may be notified of this by modifying the currently shared information (such as by changing the currently shared video information so that it fades away). In the example where the emotion is anger, this emotion may translate into modifying the shared information, such as by increasing the volume for shared audio information, modifying the color of a shared video (such as changing the color to red). Another expression construct is memory, which may include information regarding a specific event, such as a honeymoon vacation in Hawaii. Triggered by a variety of factors, such as shared information regarding vacations, regarding Hawaii, or regarding honeymoons, the shared information may be modified. For example, in order to convey the idea of the Hawaiian honeymoon, the shared information may be modified to include songs, picture (such as an overlay), text, and/or video based on the specific event. In the honeymoon example, an overlay of a tropical background may be used in conjunction with the shared information. As another example, relationship information for the expression aspect may affect the shared information. If relationship information states that a first song is not as good as a second song, and if the shared information is the first song, the shared information may be modified by playing the first song more softly or switching to playing the second song.

Another form for supplementing the communication is by supplying additional video, audio, or textual information with the communication. Similar to the selection of the representation, the selection of the additional video, audio or textual information may reflect the user profile of the sender. In the sports example discussed above, a shared communication indicating a user's team scoring may be modified or supplemented with text, video, or an audio file indicating cheering.

Expression Information Determined Based on Presence Information

Presence may determine or modify expression information. As discussed previously, presence may include any participant traits, such as short-term or long-term attributes. Expression may include any concepts or ideas the participant wishes to convey. A participant's presence may influence the participant's conveyed ideas. This link between a participant's traits and ideas enables the participant to convey his or her ideas better.

The presence and expression information may be determined for a participant to a shared information exchange. The presence information may be modified, either manually (such as by explicit input from the participant) or automatically. Based on the modification of the presence information, the expression information is modified automatically. Information to be shared with a second electronic device is then presented based on the modified expression information.

As one example, the presence of the specific participant may not have changed in a while. The participant may not have provided any input (either explicit or implicit). Based on this lack of input, the expression information may be modified (i.e., the action subcategory may be modified to sleeping). Based on the change in presence and/or expression information, shared information may be modified. For example, the shared information may change to relaxing music. In addition, if an avatar is used, the avatar may be modified to reflect a sleeping state.

Presence Information Determined Based on Expression Information

Likewise, a participant's conveyed ideas may influence the participant's traits. This link between a participant's ideas and traits enables the participant to indicate his or her presence better.

The presence and expression information may be determined for a participant to a shared information exchange. The expression information may be modified, either manually (such as by explicit input from the participant) or automatically. Based on the modification of the expression information, the presence information is modified automatically. Information to be shared with a second electronic device is then presented based on the modified presence information.

Expression information, such as action, emotion, memory, entity or relationship information may affect the identity or awareness of a participant. For example, the image or avatar associated with the participant may be modified based on emotion information, such as by dressing the avatar in all black if sad or dressing like a clown if happy. This is merely one example changing the manifestation of presence.

Shared Information or Participant Information Determined Based on Surrounding Context or Device Context In another embodiment of the invention, surrounding context may determine or modify the expression, presence and/or shared information. As discussed above, the surrounding context may include the physical surroundings of one or both of the participants to a shared information session, including current location, temperature, light, and noise. The data associated with the surrounding context may be input through a variety of sensors including a keyboard 90, a light sensor 91, an aural sensor 92, a temperature sensor 93, a barometer 94, a GPS sensor 95, an odor sensor 96, and a taste sensor 97. Based on the surroundings, the presence of a participant may be modified. For example, a surrounding of either work or home may indicate a different presence, such as a businessman avatar for the office versus a "weekend" avatar for home. The surrounding may be determined by inputting data from a GPS sensor and a comparing the data with know GPS readings. Likewise, the surroundings may affect expression. A surrounding context, such as a high noise level, may trigger an expression, such as cheering.

Moreover, the surroundings of the recipient device may modify or alter the communication sent. Modifying or supplementing the communication may be based on the recipient's profile, which may be modified due to the data from the recipient's surroundings, or may be based directly on the data from the recipient's surroundings. For example, the surroundings of the recipient device may modify the shared information sent to the recipient device. Specifically, a noise level of the surroundings, as indicated by the aural sensor 92, may affect the volume level for shared audio information. A higher surrounding noise level may translate into a higher volume level for shared audio information. As another example, the location of the recipient, as evidenced by the GPS sensor 95, may indicate the current activity of the recipient. The communication may be modified or supplemented based on the current activity, as discussed above.

In still another embodiment of the invention, device context may determine or modify the expression, presence and/or shared information. As discussed above, device context may include the specific parameters of the electronic device to a communication. The specific parameters may affect the expression, presence or shared information. A device may have limitations regarding sharing certain types of information (such as no display or a small display). These limitations may affect the type of information which may be shared. For example, in a device which has a small screen, the shared visual information may need to be modified to accommodate the small screen. Further, the device context may indicate that the display of the device has a color or a black and white screen. For example, if the display is a black and white screen, the communication may be modified from a color image to an image in grayscale. Alternatively, if the display is a color screen, the communication may be supplemented with a color image. A device may also indicate presence information, such as awareness information. When watching television, the current activity may be updated to state that the participant is currently watching television. Similarly, the current device context may implicate expression. For example, if the current device is a camera, the expression may be altered so that the current action is taking a picture.

The device context may also affect which device receives the communication. The device context may indicate which device is turned on. In determining which recipient device to send the communication to, the device context may be reviewed to determine which devices are currently operating and a device which is currently operating may receive the communication.

As one example, a user may communicate with other users using the user's profile and the other users' profiles. The user may communicate with any device, such as a telephone. The user may access his or her profile to view a buddy list. The buddy list may include a listing of other users with whom to communicate. The user may pick one or several buddies on the list and examine the profiles of those selected, if the preferences of the profiles of those selected allow it. The user may produce a communication to the selected users based on the profiles of the selected users. For example, the user may examine the current state of the selected users (such as the current location of the selected users) and the current device context (such as which device is on). The user may determine which device to send the communications based on the profiles of those selected. Further, the user may send a communication to the selected users, which may be supplemented or modified as described above. The time for sending the communication may be determined by the user, such as sending the communication immediately or sending the communication at a later time based on a rule in the rules context of the user's profile.

In the embodiment discussed above, the communication may be modified or supplemented based on a user profile. In an alternate embodiment, changes in the user profile, external properties, device properties, or histories may generate a communication to an electronic device. For example, the user profile may change based on a variety of factors. Exemplary factors are discussed with respect to FIG. 4. If the profile changes, a communication may be sent based on the change. As another example, external properties, such as a specific time, or location, may result in a communication being sent. For example, one of the rules in the rules context may state that at a predetermined time, a communication may be sent. As another example, one of the rules in the rules context may state that if an electronic device is in a predetermined location (such as at the home or office of the user), a communication may be sent. Further, a communication may be sent based on device properties, such as changes in device properties. For example, if a device property is that an electronic device is unavailable for communication (such as a cellular phone not having service), a communication may be sent based on the device property.

Figure 7:
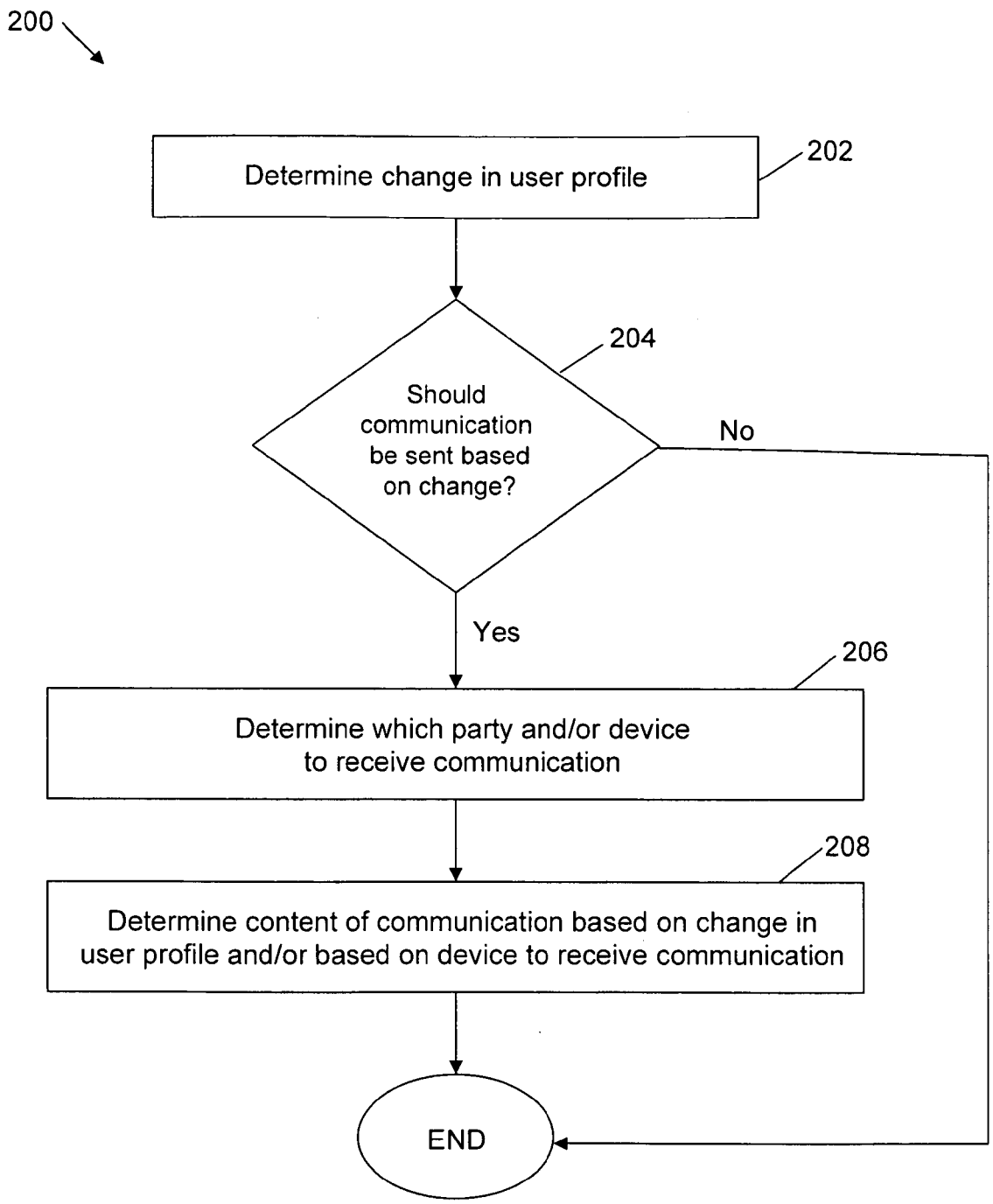
FIG. 7 is a flow chart for generating a communication based on a change in a user profile.

Referring to FIG. 7, there is shown a flow chart 200 for generating a communication based on a change in a user profile. As shown at block 202, it may be determined whether the user profile has changed. Exemplary changes to the user profile are discussed with respect to FIG. 4 in block 84. It is then determined whether to send a communication based on the change to the user profile, as shown at block 204. If a communication is to be sent, the party and/or device to receive the communication is determined, as shown at block 206. In one aspect, all communications of this type may be sent to a predetermined device. Alternatively, the change to a user profile may dictate the device to receive the communication. For example, a change may be based on awareness, such as current activity. If the current activity changes from work to play, an electronic device, such as a spouse, may be notified of the change. Further, the content of the communication may be determined. The content may be based on the change in the user profile and/or based on the device to receive the communication, as shown in block 208. In the example discussed above, if there is a change in the current activity of a specific user profile, a spouse may be notified of a change of status, such as "ON MY WAY HOME" if the spouse has left the office. Further, the format of the message may be determined based on the device of the spouse. If the designated device is a telephone, the message may be in the form of a text message or in the form of an audio message.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations, include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention of the Applicant to protect all variations and modification within the valid scope of the present invention. It is intended that the invention be defined by the following claims, including all equivalents

The invention claimed is:

1. A network server for supplementing a communication after being sent from a user on a first electronic device to a recipient on a second electronic device, the first electronic device being different from the second electronic device, the network server comprising:

a memory for storing at least one user profile for the user; and at least one processor configured to:
receive the communication;
extract data representative of identification of the user from the communication;
access the user profile for the user associated with the extracted identification data, the user profile resident on a database and comprising data representative of a current state of the user, the current state of the user being changeable and separate from the received communication;
automatically analyze the received communication based on the current state of the user from the user profile;
automatically determine supplemental information to send to the second electronic device based on the analysis of the received communication;
automatically supplement the received communication with the determined supplemental information; and
send the received communication and the supplemental information to the recipient.

2. The network server of claim 1, wherein the processor further determines a type of format which the second device supports; and
wherein the processor determines supplemental information to send to the second electronic device by selecting the supplemental information that is of the determined type of format which the second device supports.

3. The network server of claim 2, wherein the type of format comprises text; and
wherein the supplemental information comprises at least one character.

4. The network server of claim 3, wherein the current state in the user profile comprises emotion; and
wherein the character in the supplemental information is selected to convey the emotion.

5. The network server of claim 1, wherein the processor determines the supplemental information based on the user profile, the second electronic device, and the communication.

6. The network server of claim 5, wherein the communication is of a type of format; and
wherein the supplemental information is the same type of format.

7. The network server of claim 5, wherein the communication is of a type of format; and
wherein the supplemental information is a different type of format.

8. The network server of claim 1, wherein the processor is further configured to integrate the supplemental information with the communication to form an integrated communication; and
wherein the processor sends the supplemental information and the communication to the recipient by sending the integrated communication.

9. The network server of claim 1, wherein the processor is further configured to:
access a recipient profile for the recipient based on the communication, the recipient profile resident on the database and comprising external environment; and
modify the communication based on the user profile and the recipient profile.

10. The network server of claim 1, wherein the current state of the user comprises a current emotional state.

11. The network server of claim 1, wherein the processor is further configured to automatically determine a change in the current state of the user and change the user profile based on the determined change in the current state.

12. The network server of claim 11, wherein multimedia information is presented identically on the first electronic device and on the second electronic device,
wherein an event occurs in the multimedia information;
wherein the processor automatically determines the event in the multimedia information;
wherein the processor automatically determines a current emotional change based on the determined event; and
wherein the processor changes the current state of the user profile based on the determined current emotional state.

13. The network server of claim 12, wherein the multimedia information comprises a broadcast independent of any input from the first electronic device and the second electronic device.

14. The network server of claim 1, wherein determining the supplemental information to send to the second electronic device is based on the analysis of the received communication and based on the second electronic device.

15. The network server of claim 14, wherein automatically determining supplemental information to send to the second electronic device based on the analysis of the received communication and based on the second electronic device comprises:
determining at least one aspect of the second electronic device; and
determining the supplemental information based on the at least one aspect of the second electronic device.

16. The network server of claim 1, wherein the processor supplements the communication with text if the second electronic device supports text regardless of whether the communication comprises text.

17. The network server of claim 1, wherein the processor supplements the communication with audio if the second electronic device supports audio regardless of whether the communication comprises audio.

18. The network server of claim 1, wherein the processor supplements the communication with video if the second electronic device supports video regardless of whether the communication comprises video.

19. The network server of claim 1, wherein the processor is further configured to:
access a recipient profile associated with the recipient; and
wherein the processor supplements the communication based on the recipient profile.

20. The network server of claim 19, wherein the recipient profile comprises external environment data; and
wherein the communication is supplemented based on the external environment data.

21. A network server for supplementing a communication after being sent from a user on a first electronic device to a recipient on a second electronic device, the communication related to multimedia information presented identically on the first electronic device and on the second electronic device, the first electronic device being different from the second electronic device, the network server comprising:
a memory for storing at least one user profile for the user; and
at least one processor configured to:
determine an event in the multimedia information;
determine a current state based on the determined event;
update a current state profile in the user profile based on the determined event, the current state profile being changeable;
receive the communication;

extract data representative of identification of the user from the communication;

access the user profile for the user associated with the extracted identification data;

automatically analyze the received communication based on the current state profile of the user from the user profile;

automatically determine how to supplement the received communication based on analyzing the received communication;

automatically supplement the communication based on determining how to supplement the received communication; and send the supplemented communication to the recipient.

22. The network server of claim 21, wherein the current state profile comprises a current emotional state.

23. The network server of claim 21, wherein automatically determining how to supplement comprises:

determining at least one aspect of the second electronic device; and determining the supplemental information based on the at least one aspect of the second electronic device.

24. The network server of claim 21, wherein the processor supplements the communication with text if the second electronic device supports text regardless of whether the communication comprises text.

25. The network server of claim 21, wherein the processor supplements the communication with audio if the second electronic device supports audio regardless of whether the communication comprises audio.

26. The network server of claim 21, wherein the processor supplements the communication with video if the second electronic device supports video regardless of whether the communication comprises video.

27. The network server of claim 21, wherein the processor is further configured to:

access a recipient profile associated with the recipient; and wherein the processor determines how to supplement the received communication based on the recipient profile.

28. The network server of claim 27, wherein the recipient profile comprises external environment data; and wherein the communication is supplemented based on the external environment data.

* * * * *